United States Patent Office 3,585,266
Patented June 15, 1971

---

3,585,266
LIVE RABIES VIRUS VACCINE AND METHOD FOR THE PRODUCTION THEREOF
Jerrell B. Emery, Zionsville, and James L. Bittle, Indianapolis, Ind., assignors to The Dow Chemical Company, Midland, Mich.
No Drawing. Filed Feb. 24, 1969, Ser. No. 801,743
Int. Cl. C12k 5/00, 9/00
U.S. Cl. 424—89         12 Claims

ABSTRACT OF THE DISCLOSURE

The preparation of live modified rabies virus vaccine is described. A method for propagating live modified rabies virus of the ERA strain by a tissue culture technique employing bovine kidney cells from a continuous cell line, and an improved rabies vaccine produced by such method are described.

BACKGROUND OF THE INVENTION

Rabies virus has previously been cultured outside living animals primarily in suspensions of mixed nervous tissue as, for example, in mouse embryo brain or rabbit embryo brain. Another approach to the reproduction of rabies virus has been by adaptation of the virus to growth in embryonated eggs. The so-called Flury strain of rabies virus has found wide use in preparing vaccines for the immunization of dogs against rabies whereby said vaccine is grown in embryonated eggs. The Flury strain was isolated by passage of an original street virus through chick brains, and after serial intracerebral passage in baby chicks, was adapted to growth in embryonated eggs. The chick embryo-adapted rabies virus may be injected intramuscularly in dogs without producing rabies symptoms and yet fosters the production of rabies antibodies in the injected animal. The chick embryo-adapted Flury strain of rabies virus of low egg passage has involved disadvantages when employed as a vaccine for non-canine species such as cattle and cats. Both cats and cattle have been found to be much more susceptible to low egg passage Flury strain rabies virus than are dogs, and the use of the same vaccine in all three species involves danger to the more susceptible animals.

The ERA strain of rabies virus is a fixed virus strain originally isolated from a rabid dog and since propagated in mouse brain and hamster kidney calls (Fenje, Can. J. Microbiol., 6:479, 1960), in embryonated eggs and in pig kidney tissue culture (Abelseth, Can. Vet. Jour., 5:84, 1964; Abelseth, Can. Vet. Jour., 5:279, 1964). The attenuated rabies virus produced by successive passages in pig kidney tissue culture has been named the ERA strain and utilized as a vaccine for various animal species (Abelseth, Can. Vet. Jour., 5:279, 1964; Abelseth, Can. Vet. Jour., 8:221, 1967). Vaccines have been produced for commercial use with ERA strain rabies virus using pig kidney tissue culture passaged virus at the 34th to 36th passage level and further passages in pig kidney tissue culture such as a total of up to 83 passages or 150 passages have shown no indications of significantly altering the properties of the ERA strain rabies virus. The ERA strain of rabies vaccine has been found to produce relatively low serum titers of rabies antibodies in various animals. For example, antibody titers are determined by serum-virus neutralization tests carried out by the incubation of serum dilutions with a challenge virus standard (CVS) followed by intracerebral injection of the serum-virus mixture into mice to determine the highest serum dilution which protects the mice from the challenge virus. In such tests, ten- and hundred-fold dilutions of the ERA strain rabies vaccine rarely produce titers of more than 1:25 in dogs or cattle vaccinated one to two months previously.

The Madin-Darby bovine kidney cell line is an established tissue culture cell line which has been propagated for several years (Madin and Darby, Jr., Proc. Soc. Exptl. Biol. and Med., 98:574, 1958; Nelson-Rees, J. National Cancer Inst., 43:347, 1964; Nelson-Rees et al., Chromosoma Berlin, 18:70, 1966). The Madin-Darby bovine kidney cell line can be stored for long periods of time by procedures such as freezing with liquid nitrogen. Cells employed for growing virus can be propagated by known procedures, stored by known procedures, and grown with known maintenance media such as Eagle's medium, Medium 199, Earle's lactalbumin or the like which can be supplemented with animal serum such as fetal bovine serum. The cell line can also be treated with antibiotics such as streptomycin, aureomycin, kanamycin, polymyxin B, amphotericin B and the like or with other materials to prevent the contamination thereof with adventitious agents. (Johnson et al., Applied Microbiol., 15:209, 1967; Gori et al., Proc. Soc. Exptl. Biol. and Med., 117:918, 1964; Polloch et al., Proc. Soc. Exptl. Biol. and Med., 112:176, 1963; and Hayflick, Texas Reports Biol. and Med., 23:285, 1965).

SUMMARY OF THE INVENTION

This invention is concerned with a modified attenuated rabies virus vaccine and a method for the preparation thereof. More particularly, the invention is directed to an attenuated live rabies virus vaccine and a method for preparing the vaccine which comprises growing rabies virus which has been adapted to grow in primary porcine kidney cell tissue in bovine kidney cell tissue culture, specifically in bovine kidney cells of a continuous cell line. The rabies virus employed in the method of the invention is rabies virus adapted to grow in pig kidney cell tissue culture and which is attenuated, that is, which is capable of immunizing domestic animals such as dogs, cats and cattle against rabies without producing a high proportion of relatively severe undesirable reactions therein. The ERA strain of pig kidney-adapted rabies virus is such a strain of virus. The bovine kidney cell tissue culture employed is of non-primary bovine kidney cells, that is, bovine kidney cells of a continuous cell line which originated historically from primary bovine kidney tissue but which cell line has been propagated for one or more successive transferse in vitro so that the cells employed are one or more transfer levels removed from primary cells. Tissue culture prepared from the Madin-Darby bovine kidney continuous cell line is such a non-primary cell tissue culture. Thus, a particular vaccine product contemplated by the present invention comprises rabies virus produced by a method which comprises growing ERA strain attenuated live rabies virus in cells of the Madin-Darby bovine kidney cell line.

It is an object of the present invention to provide an improved live attenuated rabies virus vaccine. It is a further object of the invention to provide an improved live rabies virus vaccine having high antigenicity for dogs, cattle and cats. Another object of the invention is to provide a method for producing attenuated live rabies virus vaccine in tissue culture of a continuous cell line without the use of primary animal cell tissue culture and the risks of introducing extraneous agents associated with primary cell tissue culture.

In accordance with the present invention, it has been discovered that the cultivation of rabies virus, particularly the attenuated ERA strain of rabies virus propagated in primary porcine kidney tissue culture, in bovine kidney cell tissue culture or a continuous cell line, particularly the Madin-Darby bovine kidney cell line, produces an attenuated rabies virus of high antigenicity for domestic animals such as cattle, cats and dogs and which, however, is substantially free of undesirable side reactions.

In carrying out the method of the invention, porcine kidney-adapted live modified rabies virus is propagated in a tissue culture of bovine kidney cells of a continuous bovine kidney cell line. The ERA strain rabies virus employed has been attenuated by passages in mouse brain, primary hamster kidney, embryonated eggs and in primary porcine kidney. The inoculum of ERA strain rabies virus is preferably one which has undergone sufficient passages in primary porcine tissue culture to bring about attenuation of the virus, that is, modification of the virus so that the virus produces good antibody responses without a substantial incidence of undesirable side reactions or induction of the disease.

The bovine kidney cell culture employed is the Madin-Darby bovine kidney cell line. In the present specification and claims, Madin-Darby bovine kidney cells will be referred to as MDBK cells. The MDBK cells are produced by transfers from the continuous cell line and are many passages removed from primary cells. The MDBK cells employed for virus seed cultures are preferably cells which are substantially free of extraneous contaminants such as microorganisms, wild viruses, adventitious proteinaceous materials and the like which may normally be encountered in the preparation of primary cell tissue culture, the MDBK cells having been freed of contaminants by appropriate purification procedures carried out on previous tissue transfers in the history of the cell line. Thus, the use of a cell line rather than primary cells permits the cultivation of rabies virus in a tissue culture of cells which are historically free of contaminants, the term "historically free of contaminants" being employed to refer to the purification of the cell line by conventional procedures such as treatment with antibiotics, antibody or the like, cloning, etc. at transfer levels earlier in the history of the cell line than the preparation of the tissue cultures for vaccine production. When rabies virus is grown in tissue culture cells which are historically free of contaminants, the risk of introducing contaminants with the cell culture is substantially reduced as compared to production in primary tissue. Rabies vaccine produced in such cells can be produced in media which contain little or no antibiotics or the like. The vaccine product produced by such procedures is thus substantially free of extraneous contaminants. The MDBK cells employed for cultivation of rabies virus need not be historically free of contaminants, however, and appropriate conventional procedures can be employed to remove contaminants during vaccine production; for example, growth media containing antibiotics can be employed to remove microorganisms.

The multiplication of rabies virus in bovine kidney cell tissue culture is not accompanied by observable cytopathic effect on the tissue cells. Growth of the virus is demonstrated by conventional procedures in which serial dilutions of the fluid from the tissue cultures incubated with the virus are inoculated intracerebrally into mice. Confirmatory identification of the virus as rabies virus is also carried out by conventional serum procedures in which serial dilutions of the culture fluid are incubated with rabies antibodies or antiserum prepared against a known fixed rabies strain and the mixtures of virus with antiserum or antibody are inoculated intracerebrally into mice.

In a preferred mode of operation, MDBK tissue cultures are prepared by dispersing MDBK cells in a nutrient medium and diluting the cell dispersion to a predetermined concentration such as from 50,000 or fewer to 100,000 or more cells per milliliter with a cell nutrient medium. The diluted cell dispersion is then placed in a sterile container such as a glass bottle or tube, Blake bottle or other suitable container and incubated at a temperature of from about 30° to 37° C. for a period of time sufficient for the cells to establish a confluent monolayer on the surface of the vessel. When good monolayer growth of MDBK cells has been so obtained, the nutrient medium can then be decanted and the cells inoculated with rabies virus. In propagating rabies virus by the method of the invention, a nutrient medium is employed which is capable of sustaining growth of the bovine kidney cells and which is non-toxic to the virus, that is, the nutrient medium does not inactivate rabies virus or prevent virus replication. The nutrient medium employed for growth of the cells for seed tissue culture as well as for virus propagation can be a medium of the chemically-defined type composed of essential amino acids, purines, carbohydrates, vitamins, inorganic salts and the like capable of sustaining cell growth. Chemically-defined nutrient media such as Eagle's basal medium, Medium 199 (Morgan et al., Proc. Soc. Exptl. Biol. and Med., 73:1, 1950) or Parker and Healy's Synthetic Medium No. 858, or other nutrient media such as Earle's lactalbumin hydrolyzate supplemented with from 2, to 5, to 10 percent of animal serum such as fetal bovine serum. Fetal lamb serum or the like can also be employed. In addition, the medium can be supplemented with salt preparations such as Hank's salts or Earle's salts or with small amounts of antibiotics such as penicillin, streptomycin, kanamycin, neomycin or the like. In a typical procedure, the MDBK cells will grow to establish a confluent monolayer within about five to seven days after incubation.

In the inoculation of the MDBK cells with ERA strain rabies virus for cultivation of the virus, MDBK cells grown to confluent monolayers of seed cell cultures are preferably released from the surface of the culture vessels by conventional procedures such as enzymatic treatment with an enzyme such as trypsin or by treatment with a chelating agent such as ethylenediaminetetraacetic acid or the like. The dispersed seed cells are then diluted with nutrient growth medium to a predetermined cell concentration, preferably 50,000 to 100,000 or more cells per milliliter. The cells are incubated in a growth medium such as those described above and allowed to grow at temperatures of from about 32° to 37° C. until confluent monolayers are formed. The tissue culture growth medium is then decanted from the cells and the cell monolayer is inoculated with rabies virus and the cells and virus are incubated under conditions suitable for growth of the virus.

The inoculation can be carried out by covering the cell monolayer with a suspension of ERA strain live rabies virus in nutrient medium. In such procedure, the cell layer can be wet with a suspension of the seed virus and maintained in a stationary position for a period of time sufficient to promote absorption of the virus by the cells prior to addition of a synthetic maintenance medium with or without a serum supplement. In a preferred procedure, the cell monolayer is first covered with a synthetic nutrient medium such as Eagle's medium or Medium 199 either without serum or supplemented with about 1 to 2 percent of bovine serum, and the seed virus is then added to the culture vessels as an aqueous suspension. In another preferred procedure for inoculating the tissue culture, a suspension of live ERA strain rabies virus is inoculated into the MDBK tissue cultures before confluent monolayer of cells is obtained. In such procedure, the seed virus suspension can be mixed with the cell growth medium or a small amount of a seed rabies virus suspension can be introduced into the culture vessels immediately after the vessel is seeded with MDBK cells. In such procedure, the culture vessels are then incubated at a temperature of from about 32° to about 37° C. for a period of time sufficient for the cells to grow to confluent monolayers in the presence of rabies virus.

In the preparation of virus and of vaccines, the virus produced by passage in MDBK bovine kidney tissue culture as described herein can be harvested in any suitable fashion, generally from about three to about 14 days after the virus is seeded. In a preferred procedure, the nutrient medium containing a portion of the virus produced can be decanted from the tissue culture about three to seven days after inoculation of the tissue culture with virus. The medium can then be replaced with fresh nutrient medium and additional incubation can be then carried out for a short period of time. A final harvest of virus from the MDBK tisue culture is made by a conventional freeze-thaw procedure about seven to fourteen days, and preferably about seven to eleven days after inoculation. In such a harvest procedure, the contents of the culture vessel are frozen and then thawed to rupture the tissue cells and release virus therefrom. The resulting fluid is then decanted and can be pooled with any prior harvest of nutrient medium, and the mixture is centrifuged or filtered to remove cellular debris and produce a vaccine product. The vaccine product can be mixed with vaccine stabilizers such as casein hydrolyzates, amino acid-sugar mixtures, buffered sugar solutions or the like. The vaccine product can be titered to ascertain the potency thereof and tested by conventional seriological procedures to ascertain purity. If desired, the vaccine can be stored directly at low temperatures such as by freezing. The vaccine can also be lyophilized and preserved in sealed vessels. In a convenient procedure, the modified rabies virus product is mixed with a vaccine stabilizer adapted to enhance the retention of the virus titer thereof during lyophilization and storage, and the mixture is lyophilized to obtain a solid vaccine product which can be stored more conveniently than a frozen liquid and which can be reconstituted with sterile distilled water or the like prior to use. In addition, the virus vaccine thus produced can be again employed as seed virus for further MDBK tissue culture passages. In general, an excellent modified ERA strain live rabies virus vaccine is obtained after a single passage in MDBK bovine kidney cell tissue culture; however, additional passages of virus in MDBK cell tissue culture are similarly useful for preparing modified ERA strain rabies vaccine.

DESCRIPTION OF THE PREFERRED EMBODIMENTS

The following examples are illustrative of the invention but are not to be construed as limiting the same.

Example 1

Live rabies virus of the ERA strain, which is characterized as having been modified from the originally isolated virus by sufficient successive passages in mouse brain, primary hamster kidney, embryonated eggs and primary porcine kidney tissue until the resulting ERA strain rabies virus is capable of immunizing dogs against rabies without producing a high proportion of relatively severe undesirable reactions, is employed as seed virus. The seed virus produces mouse-infective titers of about $10^{-3.4}$ per 0.03 milliliter when grown in primary porcine kidney tissue by the procedure of Abelseth, Can. Vet. Jour., 5:279, 1964. Sterile glass tissue culture tubes are prepared by seeding the tubes with one milliliter of a suspension of MDBK cells in Eagle's medium supplemented with 10 percent fetal calf serum, the suspension containing about 100,000 cells per milliliter. The MDBK cells employed are historically free of contaminants and are taken from the 203rd transfer of the MDBK cell line. The tissue culture tubes are inoculated by adding 0.2 milliliter of the porcine kidney propagated ERA strain rabies virus having a titer of about $10^{-3.4}$ per 0.03 milliliter immediately after seeding with the cell suspension. The tubes are incubated in a stationary position at a temperature of 35° C. for three days until the confluent monolayer of MDBK cells has developed. At this time, the medium is decanted and replaced with maintenance medium comprising Eagle's basal medium supplemented with 2 percent fetal calf serum. The tubes are then placed in a roller drum apparatus and agitated slowly by rolling for an additional four days at a temperature of 35° C. On the seventh day after the above inoculation of the tissue culture with the rabies virus, the culture medium is frozen and thawed to release intracellular virus and the resulting mixture is centrifuged to remove cellular debris. A portion of the supernatant liquid from the centrifuged mixture is reserved to be employed as an inoculum for subsequent fresh tubes of MDBK tissue filter. A portion of the supernatant liquid is titrated by intracerebral inoculation in mice and found to have a titer of greater than $10^{-4.5}$ per 0.03 milliliter.

Example 2

The procedure of Example 1 is repeated for a series of subsequent passages in the MDBK cell tissue culture employing 0.2 milliliter of the harvested liquid virus suspension from the previous passage as the inoculum for the next succeeding passage. In each such passage, the MDBK cells are allowed to grow to form a confluent monolayer of cells prior to inoculation with the seed virus. In such procedure, after confluent monolayers are obtained, the cell growth medium is removed and about two milliliters of the maintenance medium consisting of Eagle's basal medium supplemented with 2 percent fetal calf serum are added to each culture vessel immediately prior to addition of 0.2 milliliter of the virus inoculum. The inoculated tubes are incubated at a temperature of 35° C. in a roller drum apparatus. Harvests are made at seven to eleven day intervals after inoculation. In such procedures, virus titers greater than $10^{-4.5}$ per 0.03 milliliter are consistently obtained with each passage level. After three such additional MDBK tissue passages, the harvest liquid is found to have a titer of greater than $10^{-6.4}$ and to have a neutralization index of 6300 as ascertained by intracerebral inoculation in mice employing rabbit origin antiserum prepared against strain 980 of fixed rabies virus. After six such additional passages, or a total of seven passages in MDBK cell tissue culture, the supernatant liquid from the culture, after freezing and thawing and separation of cellular debris, is found to have a titer of $10^{-5.4}$ per 0.03 milliliter. This passage level represents a dilution factor of $10^{-12.4}$ from the original starting ERA strain of rabies virus.

Example 3

ERA strain of rabies virus is passed in MDBK cell tissue culture exactly as described above with respect to Examples 1 and 2 for a total of four successive serial passages. The culture liquid from the fourth passage, having a virus titer of $10^{-6.4}$, is employed as seed virus for the production of a vaccine lot. In this procedure, MDBK cells which are historically free of contaminants and at the 210th transfer level in the MDBK cell line are employed as seed cells. The MDBK cells are seeded by a procedure similar to that of Example 1, the cells being seeded in 32-ounce glass prescription bottles and incubated at a temperature of about 35° C. for five days, at which time confluent cell monolayers are established. The cell monolayers are drained of maintenance medium and the seed virus liquid is diluted ten-fold in maintenance medium and inoculated to the cell monolayers in the amount of 10 milliliters of seed virus dilution per bottle. In such inoculation procedure, the seed virus dilution is poured over the cell monolayer and the culture bottle and contents are held in a stationary position at a temperature of 32° to 37° C. for from about one to two hours so that the inoculum covers the cell sheet. On completion of this adsorption period, 90 milliliters of Eagle's basal medium supplemented with 2 percent fetal calf serum are added to each bottle and the bottles are incubated at a temperature of 35° C. During such incubation, the bottles are maintained stationary in a position in which the nutrient medium covers the cell sheet.

On the tenth day after the inoculation of the tissue culture, the culture medium is harvested by freezing, thawing and removing cellular debris by centrifugation. The harvested culture liquid containing the modified virus is pooled and mixed together with a lactose glutamate stabilizer. The stabilizer employed contains 10 parts by weight of lactose and 1 part by weight of monopotassium glutamate in 1000 parts by weight of phosphate-buffered water. The stabilizer and pooled harvest liquid are mixed together in the proportions of 5 parts by volume of stabilizer to 95 parts by volume of harvest liquid. The vaccine lot is titrated by intracerebral inoculation in mice and found to have a titer of about $10^{-5.3}$ per 0.03 milliliter. Separate portions of the virus vaccine thus prepared are stored by freezing at a temperature of $-70°$ C. or below; other portions are lyophilized and stored in sterile containers and further separate portions are employed as vaccines.

Example 4

In a representative operation, the vaccine of Example 3 is administered to a group of cats which have been established by conventional seriological methods to have no detectable rabies antibodies prior to vaccination. In the vaccination procedures, the vaccine of Example 3 is administered in a single one milliliter dose to each cat by intramuscular injection. Two weeks after administration of the vaccine, the vaccinated cats are found to have developed rabies antibody titers substantially greater than the titers known to be sufficient to protect the animals against street challenge of rabies. The geometric mean antibody titer observed with the cats two weeks after administration of the vaccine is greater than 1:121. Similarly high antibody levels response are found to persist for five months following administration of the vaccine, indicating that excellent antibody conversion has taken place.

Example 5

Several separate groups of six month old calves, A, B, C and D, are tested by serum neutralization procedures for the presence of rabies antibodies and found to possess no detectable antibody. The calves are then administered the virus vaccine of Example 3 or a dilution thereof by the intromuscular injection of a single 2-milliliter dose of the vaccine or dilution. Calves of group A are administered the undiluted vaccine, those of group B are administered a ten-fold dilution, those of group C are administered a 100-fold dilution and the calves of group D are administered a 1000-fold dilution. Two weeks after administration of the vaccine preparations, serum is drawn from each of the calves and titered in mice to determine antibody titers. The calves in groups A, B and C, respectively, are found to have antibody titers of greater than 1:200, 1:141 and 1:170, respectively, while the calves in group D have antibody titers of 1:67. Serum is again obtained four weeks after vaccination, at which time the geometric mean antibody titer in each of groups A, B, C and D is found to be greater than 1:120, with the calves of group C having antibody titers of greater than 1:230. No adverse reactions to the vaccine are noted in any of the calves. Continued observation for four months indicates that antibody levels well above those required to protect the calves against a street challenge of virulent rabies virus are maintained in all the calves, with no adverse effects being observed in any of the calves.

Example 6

Additional operations, representative of operations with the ERA strain live attenuated rabies vaccine cultivated in MDBK tissue culture, are carried out with susceptible dogs. In such operations, four groups of dogs, A, B, C and D, are determined to have no detectable rabies antibody by serum neutralization procedures carried out in mice. The dogs are then vaccinated by intramuscular injection of a single one milliliter dose of the virus vaccine of Example 3 or a dilution thereof. The dogs in group A receive the undiluted vaccine; the dogs in group B receive a 10-fold dilution of vaccine; the dogs in group C receive a 100-fold dilution; and the dogs in group D receive a 1000-fold dilution. Blood samples are drawn from each dog two weeks after vaccination and serum antibody levels are determined. The antibody levels observed in each dog are comparable to or greater than those levels known to be sufficient to protect dogs against a street challenge of rabies. The geometric mean antibody titer in the dogs of group A vaccinated with undiluted vaccine and in the dogs of group D vaccinated with a 1000-fold dilution of the vaccine is found to be greater than 1:200. Serum samples are again taken four weeks after vaccination and assayed for serum antibody titer. The geometric mean antibody titer is greater than 1:160 for each of groups A, B, C and D. The dogs are held for a total of four months after vaccination. No adverse effects attributable to the vaccine are observed at any time. Serum samples taken four months after vaccination are titered and rabies antibody titers in each group are found to be sufficiently high to protect the animals from a street rabies challenge. Geometric mean antibody titers of 1:140 and 1:151 are observed with the dogs of groups A and D, respectively.

The foregoing examples demonstrate the improved antigenicity of the ERA strain rabies virus produced in MDBK bovine kidney tissue and the improvements in virus titer obtained by such procedure. The improved antigenicity of such rabies virus is obtained with no increase in virulence of the virus for dogs, cats or cattle. Various modifications in the procedures described above can be employed to produce varying effects in virus yield, for example, or to accomplish production of the modified virus with a greater or lesser number of passages in MDBK bovine kidney culture such as one passage, to 10, to 50, to 100 or more passages without substantial variance from the concept of the present invention. For example, other media such as Medium 199 supplemented with fetal lamb serum or supplemented with antibiotics can be employed; chemically-defined media containing no serum can be employed; various inoculation procedures can be employed; multiple harvests of vaccine can be made by periodically removing culture liquid containing virus prior to harvesting intracellular virus by freezing and thawing cells; additional passages in primary porcine tissue culture or other suitable tissue can be employed either prior or subsequent to the cultivation of the ERA strain rabies virus in MDBK bovine kidney cell tissue culture.

What is claimed is:
1. A method which comprises passing attenuated ERA strain rabies virus, which has been adapted to grow in porcine kidney cell tissue, in Madin-Darby tissue culture of non-primary bovine kidney cells for a number of passages sufficient to increase the antigenicity of the virus.

2. A method useful for propagating a modified ERA strain live ribies virus adapted to grow in porcine kidney cell tissue which comprises inoculating Madin-Darby bovine kidney cells of continuous bovine kidney cell line origin with said virus and incubating said virus and cells in a tissue culture nutrient medium for a time sufficient for virus replication to take place.

3. The method of claim 2 wherein the incubation is carried out at a temperature of from about 32° to about 37° C. for from about three to about fourteen days.

4. A method useful for preparing an attenuated live virus suitable for immunizing animals against rabies which comprises the steps of inoculating a live attenuated ERA strain rabies virus, which has been adapted to grow in porcine kidney tissue cell culture and which is itself capable of immunizing animals without producing a high proportion of relatively severe undesirable reactions, into Madin-Darby tissue culture of bovine kidney cells of cell line origin, incubating said virus and cells in a nutrient fluid capable of supporting said tissue culture growth of said cells and which is non-toxic to said virus under conditions conducive to virus growth for a period of time sufficient for replication of said virus and harvesting at least a portion of the virus so produced.

5. A method useful for preparing an attenuated live virus suitable for immunizing domestic animals against rabies which comprises the steps of introducing a live attenuated ERA strain rabies virus, which has been adapted to grow in porcine kidney tissue cell culture and which is itself capable of immunizing domestic animals without producing a high proportion of relatively severe undesirable reactions, but which is incapable of producing relatively high antibody titers in domestic animals, into Madin-Darby tissue cultures of bovine kidney cells one or more passages removed from primary tissue, incubating said virus and cells in a nutrient fluid capable of supporting tissue culture growth of said cells and which is non-toxic to said virus under conditions conducive to virus replication for a period of time sufficient to permit replication of said virus, harvesting at least a portion of the virus so produced and reintroducing such harvested virus into fresh cultures of such bovine kidney tissue cell culture and repeating such culture passage of the virus serially for a sufficient number of passages to produce a virus modified as regards the degree of antibody response thereto.

6. The method of claim 5 wherein the incubation is carried out at a temperature of from about 32° to about 37° C. for from about three to about fourteen days.

7. The method of claim 5 wherein the incubation is carried out at a temperature of from about 32° to about 37° C., wherein the incubation in the final passage is continued until there has been sufficient growth of the virus to produce a useful concentration thereof, wherein a vaccine material containing the resulting modified virus in relatively high concentration is harvested from said final passage and wherein the resulting vaccine product is frozen.

8. A method useful for preparing an attenuated live virus suitable for immunizing animals against rabies which comprises passing a live attenuated ERA strain rabies virus, which has been adapted to grow in porcine kidney cell tissue culture and which is itself capable of immunizing animals without producing a high proportion of relatively severe undesirable reactions, in bovine kidney cells by introducing such virus into tissue cultures of Madin-Darby bovine kidney cell line cells, incubating said cells and virus in a nutrient fluid capable of supporting said tissue growth and which is non-toxic to said virus under conditions conducive to virus growth for a period of time sufficient to foster growth of said rabies virus, harvesting at least a portion of the virus so produced and reintroducing such harvested virus into fresh cultures of such bovine kidney tissue cell culture and repeating such culture passage of the virus serially for a number of serial passages sufficient to produce a virus modified as regards the degree of antibody response thereto without decrease of antigenicity for producing rabies antibodies.

9. A method useful for preparing an attenuated live rabies virus vaccine which comprises passing a fixed live rabies virus of the ERA strain in Madin-Darby bovine kidney tissue culture by introducing said live ERA strain virus into tissue cultures of non-primary bovine kidney cell tissues of cell line origin, said cells being historically free of contaminants, incubating said virus and said cells in a nutrient fluid capable of supporting said growth of said cells and which is non-toxic to said virus under conditions conducive to replication of said virus for a period of time sufficient for replication of said virus, harvesting at least a portion of the virus so produced and reintroducing such harvested virus into fresh cultures of such bovine kidney tissue cell culture and repeating such culture passage of the virus serially for a number of passages sufficient to produce a virus modified as regards the extent of antibody response thereto without loss of antigenicity for producing rabies antibodies.

10. The method of claim 9 wherein the incubation in the final passage is continued until there is sufficient replication of virus to provide a useful concentration thereof and wherein a vaccine material containing a relatively high concentration of the resulting modified virus is harvested therefrom and incorporated with a stabilizer.

11. A vaccine product produced by the method which comprises the steps of passing a live attenuated ERA strain rabies virus, which has been adapted to grow in porcine kidney cell tissue culture and which is itself capable of immunizing domestic animals without producing a high proportion of relatively severe undesirable reactions, in Madin-Darby tissue culture of bovine kidney cells of cell line origin for a sufficient number of passages to produce a virus modified as regards increased antigenicity thereof, continuing the incubation in the final passage until there has been sufficient growth of the virus to produce a useful concentration thereof and harvesting a vaccine material containing the resulting attenuated virus in relatively high concentration.

12. The vaccine product of claim 11 wherein the process by which the vaccine product is prepared further comprises the steps of incorporating a stabilizer in the harvested vaccine material and lyophilizing the resulting mixture.

References Cited

UNITED STATES PATENTS

| | | | |
|---|---|---|---|
| 2,768,114 | 10/1956 | Koprowski et al. | 424—89 |
| 2,773,800 | 12/1956 | Powell | 424—89 |
| 3,143,470 | 8/1964 | Wilner | 424—89X |
| 3,156,620 | 11/1964 | Sharpless | 424—89 |
| 3,255,080 | 6/1966 | Emery | 424—89 |
| 3,397,267 | 8/1968 | Fernandes et al. | 424—89 |
| 3,423,505 | 1/1969 | Crawley et al. | 424—89 |

OTHER REFERENCES

Science 139: 15–20, Jan. 4, 1963, "Committee Report: Continuously Cultured Tissue Cells and Viral Vaccines."

SHEP K. ROSE, Primary Examiner

U.S. Cl. X.R.

195—1.1, 1.3, 1.8